United States Patent
Ohba et al.

(10) Patent No.: US 10,023,228 B2
(45) Date of Patent: Jul. 17, 2018

(54) STEERING DEVICE

(71) Applicant: NTN CORPORATION, Osaka (JP)

(72) Inventors: Hirokazu Ohba, Shizuoka (JP); Tomomi Ishikawa, Shizuoka (JP); Taisuke Igi, Shizuoka (JP); Yuya Yamaguchi, Shizuoka (JP)

(73) Assignee: NTN Corporation, Osaka (JP)

( * ) Notice: Subject to any disclaimer, the term of this patent is extended or adjusted under 35 U.S.C. 154(b) by 284 days.

(21) Appl. No.: 15/024,518

(22) PCT Filed: Sep. 22, 2014

(86) PCT No.: PCT/JP2014/075030
§ 371 (c)(1),
(2) Date: Mar. 24, 2016

(87) PCT Pub. No.: WO2015/046123
PCT Pub. Date: Apr. 2, 2015

(65) Prior Publication Data
US 2016/0236710 A1    Aug. 18, 2016

(30) Foreign Application Priority Data
Sep. 26, 2013 (JP) ................................. 2013-200168

(51) Int. Cl.
*B62D 3/12* (2006.01)
*B62D 7/15* (2006.01)
(Continued)

(52) U.S. Cl.
CPC ............. *B62D 7/1509* (2013.01); *B62D 3/12* (2013.01); *F16H 19/04* (2013.01); *B60K 7/0007* (2013.01);
(Continued)

(58) Field of Classification Search
CPC ...... B62D 7/1509; B62D 3/12; B62K 7/0007; F16H 19/04
See application file for complete search history.

(56) References Cited

U.S. PATENT DOCUMENTS 3,094,007 A * 6/1963 Luhrs ....................... A47B 1/10
108/87
4,630,701 A 12/1986 Venetjoki
(Continued)

FOREIGN PATENT DOCUMENTS

| CN | 1944154 | 4/2007 |
| JP | 60-226358 | 11/1985 |

(Continued)

OTHER PUBLICATIONS

Extended European Search Report dated Oct. 6, 2016 in corresponding European Application No. 14847569.2.
(Continued)

*Primary Examiner* — David M Fenstermacher
(74) *Attorney, Agent, or Firm* — Wenderoth, Lind & Ponack, L.L.P.

(57) ABSTRACT

A steering device is provided which allows the vehicle to move laterally and turn with a small radius, without using a complicated mechanism, and capable of stably controlling the steering angle during such modes. The steering device includes a pair of rack bars connected, respectively, to front right and front left vehicle wheels or rear right and rear left vehicle wheels, synchronizing gears disposed between the pair of rack bars, a synchronizing gear box retaining the synchronizing gears, a rack case fixed to the frame of the vehicle, and a fixing mechanism for fixing the synchronizing gear box to the rack case.

4 Claims, 9 Drawing Sheets

(51) Int. Cl.
*F16H 19/04* (2006.01)
*B60K 7/00* (2006.01)
*B60K 17/04* (2006.01)

(52) U.S. Cl.
CPC .... *B60K 17/046* (2013.01); *B60K 2007/0092* (2013.01)

(56) References Cited

U.S. PATENT DOCUMENTS

| | | | |
|---|---|---|---|
| 5,082,077 A | | 1/1992 | Holka |
| 5,381,705 A | | 1/1995 | Takahashi |
| 6,039,334 A | * | 3/2000 | Ozeki ............... B62D 5/22 280/93.514 |
| 6,845,993 B2 | * | 1/2005 | Shirai ............... B62D 3/12 180/428 |
| 8,844,953 B2 | * | 9/2014 | Smyth ............... B62D 3/12 280/93.51 |
| 9,758,190 B2 | * | 9/2017 | Ohba ............... B62D 3/12 |
| 9,834,249 B2 | * | 12/2017 | Ishikawa ............... B62D 7/1509 |
| 2010/0106375 A1 | | 4/2010 | Ahmed et al. |

FOREIGN PATENT DOCUMENTS

| | | |
|---|---|---|
| JP | 63-173766 | 7/1988 |
| JP | 3-112724 | 5/1991 |
| JP | 4-262971 | 9/1992 |
| JP | 2600374 | 8/1999 |
| JP | 2003-127876 | 5/2003 |
| JP | 2005-297782 | 10/2005 |
| JP | 2007-22159 | 2/2007 |
| JP | 2007-210374 | 8/2007 |
| JP | 2009-208521 | 9/2009 |
| JP | 2011-208742 | 10/2011 |
| WO | 2013/054357 | 4/2013 |

OTHER PUBLICATIONS

International Search Report dated Dec. 16, 2014 in corresponding International Application No. PCT/JP2014/075030 (with English translation).

Written Opinion of the International Searching Authority dated Dec. 16, 2014 in corresponding International Application No. PCT/JP2014/075030 (with English translation).

\* cited by examiner

Fig. 12

# STEERING DEVICE

TECHNICAL FIELD

This invention related to a steering device for steering front vehicle wheels or rear vehicle wheels, such steering devices constituting a four-wheel steering mechanism.

BACKGROUND ART

A steering mechanisms known as an Ackerman-Jeantaud steering mechanism includes a steering link mechanism connecting together right and left vehicle wheels (an assembly including a tire, a rim, a hub, an in-wheel motor, etc.) is hereinafter referred to as "vehicle wheel" or simply "wheel", and used to steer the vehicle wheels. This steering mechanism includes tie rods and knuckle arms such that while the vehicle is turning, the right and left wheels move around the same center point.

There is also known a steering mechanism including an actuator capable of changing the lengths of the tie rods, the distance between the (right and left) tie rods, or the angles between the respective wheels and the knuckle arms. This steering mechanism allows smooth normal traveling, smooth parallel traveling, and smooth small-radius turning, and is sufficiently responsive (see, for example, JP Patent Publication 04-262971A).

There are also known steering mechanisms disposed, respectively, between the front right and front left wheels and between the rear right and rear left wheels, and each including right and left separate rack bars rotatable about their axes, and a forward-and-reverse switching means provided between the rack bars. The forward-and-reverse switching means is capable of transmitting the rotation of one of the rack bars to the other rack bar so that the other rack bar is rotated selectively in one and the other direction. This steering device allows the wheels to form a steering angle of 90 degrees, and allows lateral movement of the vehicle (see, for example, JP Patent Publication 2007-22159A).

A four-wheel steering vehicle is also known including an actuator actuated when the front wheels are steered to steer the rear wheels (see, for example, JP Utility Model Registration 2600374). Another steering mechanism includes a rack housing connecting right and left wheels together, and movable in the fore-and-aft direction to perform toe adjustment of the right and left wheels, thereby improving travel stability (see, for example, JP Patent Publication 2003-127876A).

A steering mechanism is also known which includes two rack bars movable to the right and left independently of each other, and connected, respectively, to the right and left wheels through tie rods, such that the rack bars are movable in the opposite directions to each other relative to a synchronizing gear box by means of synchronizing gears retained in the synchronizing gear box (see JP Patent Application 2013-158876).

An ordinary Ackerman-Jeantaud steering mechanism allows smooth normal travel because, during normal traveling, the lines perpendicular, in plan view, to the lines of rotation of the respective wheels (widthwise center lines of the wheels) converge on the center of turning of the vehicle. However, even if it is desired to move the vehicle laterally (parallel movement in the lateral direction with respect to the fore-and-aft direction of the vehicle), it is difficult to steer the wheels in the direction perpendicular to the fore-and-aft direction of the vehicle due to the lengths of the steering links and interference with other members. Also, even if one of the right and left wheels is steered by 90 degrees, the one and the other of the right and left wheels never becomes completely parallel to each other, thus making smooth travel difficult.

In these type of vehicles, the front wheels as the main steered wheels are steerable in a predetermined travel direction, while the rear wheels as the auxiliary steered wheels are arranged parallel to the fore-and-aft direction of the vehicle. Thus, when the vehicle is turned by steering the front wheels, the rear wheels follow different turning circles from those of the front wheels. In particular, while the vehicle is traveling at a low speed, the rear wheels follow circles located inside of the circles followed by the respective front wheels, and while the vehicle is traveling at a high speed, under a centrifugal force, the front wheels follow circles located inside of the circles followed by the respective rear wheels. That is, when the front wheels are steered in the direction in which the vehicle is supposed to be turned, the vehicle cannot be turned in this direction. A vehicle including a four-wheel steering mechanism, which steers not only the front wheels but also the rear wheels, is free of this problem and improves travel stability.

The vehicle with a four-wheel steering mechanism (known as "4WS vehicle") disclosed in JP Patent Publication 04-262971A allows lateral traveling and small-radius turning, of the vehicle. However, since this vehicle include a large number of actuators for changing the lengths of the tie rods, the distance between the (right and left) tie rods, and the angles between the respective wheels and the knuckle arms, control of the actuators is complicated. The mechanism disclosed in JP Patent Publication 2007-22159A is not only complicated in structure, but also a large number of gears are used to steer the wheels by rotating the rack bars, which tends to lead to looseness and makes smooth steering of the wheels difficult.

JP Utility Model Registration 2600374 discloses a conventional four-wheel steering mechanism. While this mechanism allows steering of the rear wheels, but does not enable lateral traveling for the same reasons as set forth above. The mechanism disclosed in JP Patent Publication 2003-127876A enables toe adjustment, but does not allow lateral traveling and small-radius turning.

JP Patent Application 2013-158876 is a patent application filed by the present applicant, solves the above-mentioned problems of the other JP patent documents discussed above, and is capable of performing basic four-wheel steering functions without a problem. However, while the vehicle is traveling on a snow-covered road, or otherwise, the road condition is not favorable, if the frictional states of the road surfaces with which the right and left wheels are in contact are extremely different from each other, since the rack bars are connected to the right and left wheels, respectively, depending on e.g. the difference in frictional states between the road surfaces with which the right and left wheels are in contact, when the wheels are steered, one of the rack bars may stop, or the right and left wheels are steered at different steering speeds. This makes it impossible to symmetrically steer the right and left wheels, and thus to eventually achieve the target wheel angle. For example, if the frictional force between the left wheel and the road surface is larger than the frictional force between the right wheel and the road surface, only the right wheel could be steered markedly with the left wheel not steered. (This is because the rack bar connected to the left wheel does not move, so that the rack bar connected to the right wheel moves a distance which is the sum of the movements of the right and left rack bars while the vehicle is traveling normally.)

SUMMARY OF THE INVENTION

An object of the present invention is to provide a four-wheel steering vehicle which is capable of moving laterally and turning with a small radius, without using a complicated mechanism, and capable of stably and reliably controlling the steering angle while the wheels are steered.

In order to achieve this object, the present invention provides a steering device comprising:

tie rods connected, respectively, to right and left wheels which are constituted by a pair of front wheels of a vehicle or a pair of rear wheels of the vehicle, and configured to steer the respective right and left wheels;

a pair of rack bars connected to the respective tie rods, a synchronizing gear meshing with the pair of rack bars, and configured to convert a movement of one of the rack bars in one of opposite directions, which are right and left directions, along a direction in which teeth of the rack bars are arranged, to a movement of the other of the rack bars in the other of the opposite directions, a rack bar moving means capable of moving the respective rack bars in one and the other of the opposite directions, a rack case retaining the rack bars and fixed to a frame of the vehicle, and a fixing mechanism capable of fixing the synchronizing gear box to the rack case, wherein the steering device is configured such that when the rack bars are moved in one and the other of the opposite directions, respectively, the synchronizing gear box is fixed to the rack case by the fixing mechanism.

By connecting the right and left wheels to the pair of rack bars movable to the right and left independently of each other through the respective tie rods, it is possible, during a normal travel mode, to actuate the rack bars as an integral body without giving the driver any feeling different from conventional steering operation, and to perform various travel modes such as small-radius turning, pivot turning and lateral traveling, by moving the rack bars in the opposite directions to each other.

Since the rack bars can be selectively locked together and separated from each other, no complicated mechanism and control is necessary, so that it is possible to reduce the cost of the steering device. That is, in a four-wheel steering vehicle, it is possible to perform lateral traveling and small-radius turning by steering the front wheels and the rear wheels in the same direction or in the opposite directions.

Further, since the steering device is configured such that when the rack bars are moved in one and the other of the opposite directions, respectively, namely, when the right and left wheels are steered in opposite directions, the synchronizing gear box is fixed to the rack case fixed to the frame of the vehicle, even if surfaces with which the tires are brought into contact are inclined or are different in frictional state from each other, it is possible to move the pair of rack bars by the same distance in the right and left directions, respectively.

For example, even if the frictional force between the left wheel and the road surface is larger than the frictional force between the right wheel and the road surface, it is possible to prevent a situation in which the rack bar connected to the left wheel does not move, while only the rack bar connected to the right wheel is moved by a large distance. This in turn makes it possible to quickly move the wheels to the target angle, and thus to stably control the steering angle.

In the above arrangement, the steering device is preferably configured such that when the synchronizing gear box is at a position where the synchronizing gear box is supposed to be located while the vehicle is moving in a straight line, the synchronizing gear box is fixed in position. Further, in any of the above arrangements, the synchronizing gear box may be fixed to the rack case by the fixing mechanism when the rack bars are moved in one and the other of the opposite directions, respectively.

By connecting the right and left wheels to the pair of rack bars movable to the right and left independently of each other through the respective tie rods, it is possible, during a normal travel mode, to actuate the rack bars as an integral body without giving the driver any feeling different from conventional steering operation, and to perform various travel modes such as small-radius turning, pivot turning and lateral traveling, by moving the rack bars in the opposite directions to each other. Since the rack bars can be selectively locked together and separated from each other, no complicated mechanism and control is necessary, so that it is possible to reduce the cost of the steering device. Further, by the provision of the fixing mechanism for fixing the synchronizing gear box to the rack case fixed to the frame of the vehicle, it is possible to reliably move the pair of rack bars in one and the other of the opposite directions, respectively. That is, in a four-wheel steering vehicle, it is possible to perform lateral traveling and small-radius turning by steering the front wheels and the rear wheels in the same direction or in the opposite directions, and to stably control the steering angle during these modes.

DETAILED DESCRIPTION OF THE INVENTION

An embodiment of the present invention is described. In the embodiment, two steering devices according the present invention are used for a vehicle 1 including in-wheel motors M mounted in the rims of all of the front right, front left, rear right and rear left wheels w. The in-wheel motors M allow various travel patterns.

Figure 1:
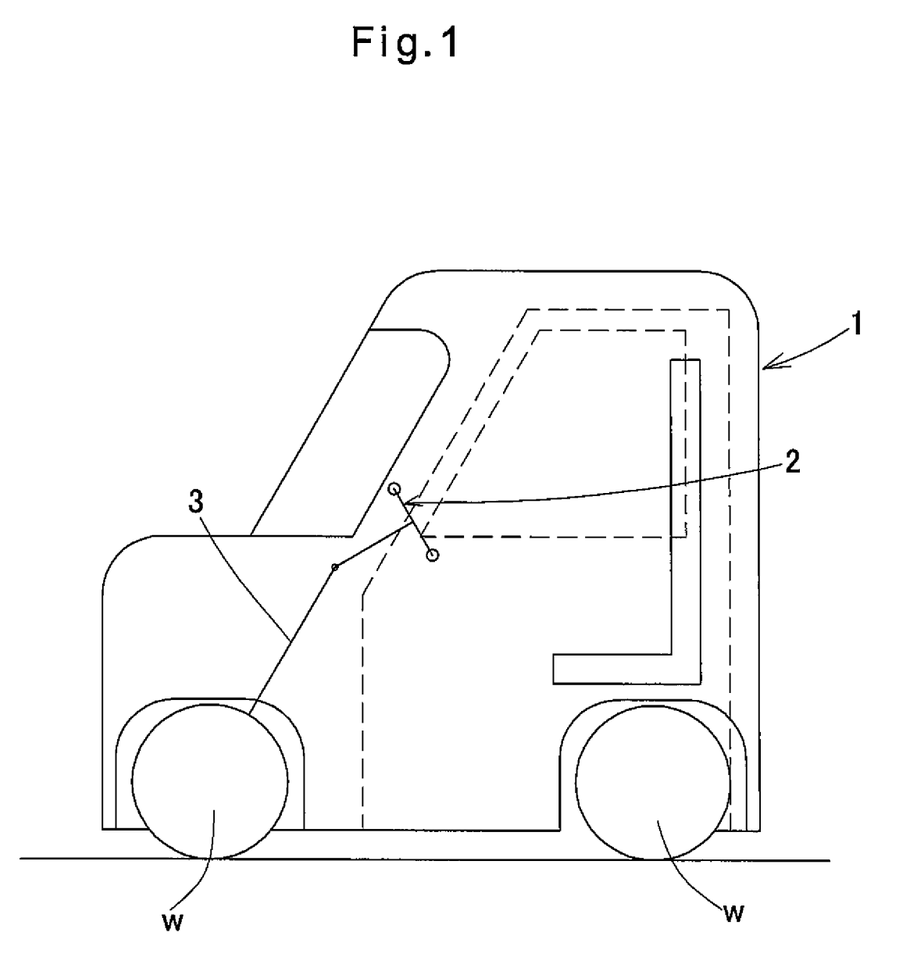
FIG. 1 shows a vehicle using steering devices embodying the present invention.

FIG. 1 shows the vehicle 1, in which the steering devices of the embodiment are used. This vehicle is an ultra-small (laterally arranged) two-seater mobility vehicle. The vehicle 1 is configured such that by operating a steering 2, the wheels w can be steered through a steering shaft 3. The present invention is not only applicable to such an ultra-small mobility vehicle but also to an ordinary vehicle.

Figure 2:
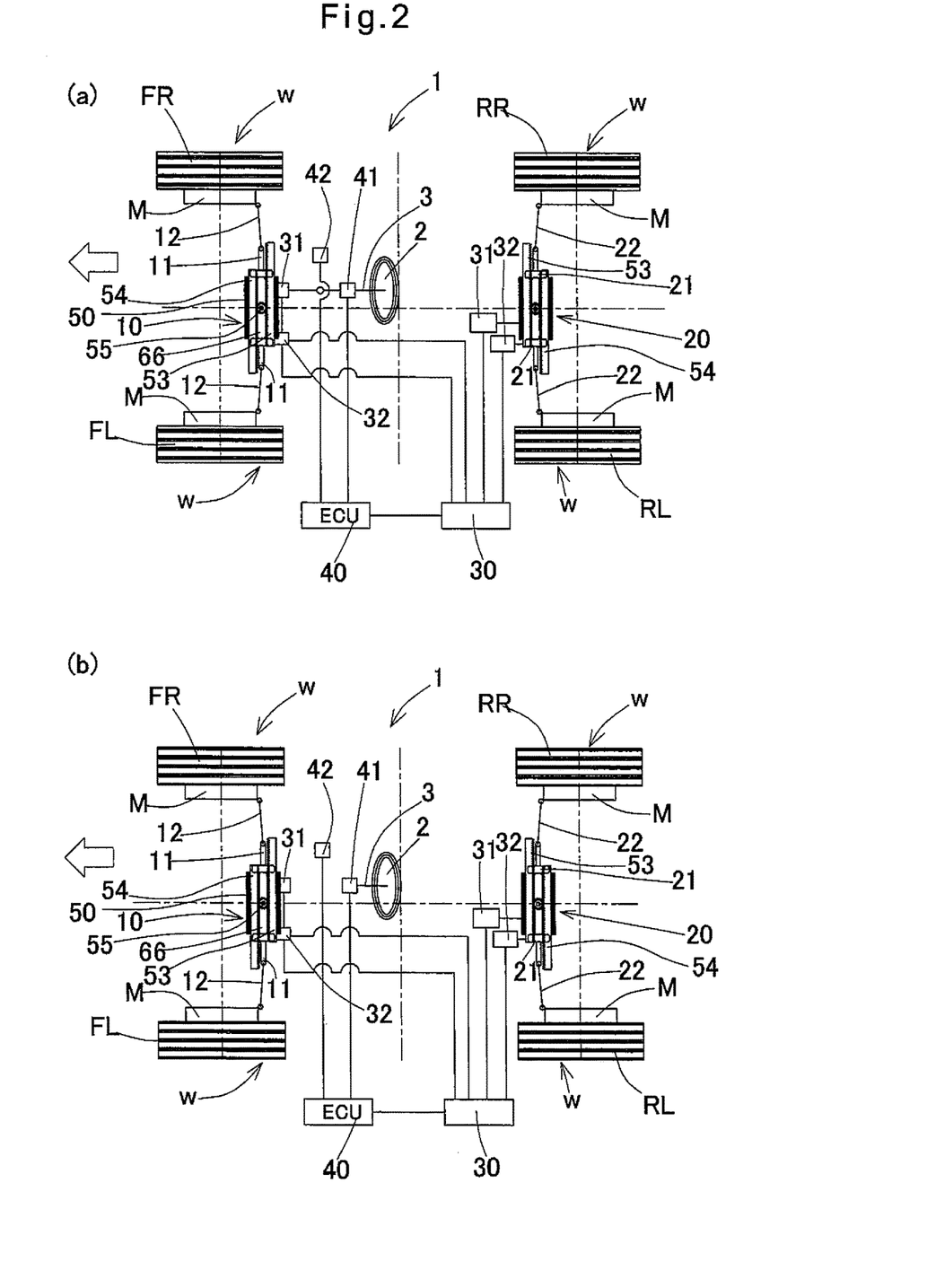
FIGS. 2(a) and 2(b) are plan views of an ordinary vehicle and a steer-by-wire type vehicle, respectively, each including steering devices of the embodiment.

FIGS. 2(*a*) and 2(*b*) are schematic plan views of the vehicle of the embodiment showing its drive line. One of the steering devices, i.e. the steering device 10 is coupled to the front right wheel FR and the front left wheel FL through tie rods 10, while the other steering device 20 is coupled to the rear right wheel RR and the rear left wheel RL through tie rods 22.

The steering device 10 for the front wheels allows normal steering of the vehicle by operating a pinion shaft 61 (see FIG. 10) through a steering shaft 3 (if the vehicle is an ordinary vehicle (see FIG. 2(*a*)) or through an actuator 31 such as a motor actuated by turning a steering 2. The steering device 20 for the rear wheels allows steering of the rear wheels in the same manner as the front wheels, by operating the pinion shaft 61 (see FIG. 10) in the same manner through the steering shaft 3 (if the vehicle is an ordinary vehicle (see FIG. 2(*a*)) or through the actuator 31 such as a motor actuated by turning a steering 2. by actuators such as motors. The steering devices 10 and 20 thus constitute a four-wheel steering mechanism.

One of these steering devices 10 and 20 according to the present invention may be omitted. If the steering device 10 for the front wheels is omitted, a conventional ordinary steering device may be coupled to the front wheels.

Each of the steering devices 10 and 20 for the front wheels and the rear wheels includes a first rack bar 53 connected to the left wheel w, with respect to the fore-and-aft direction of the vehicle, and a second rack bar 54 connected to the right wheel w, to steer the right and left wheels. In each of FIGS. 2 to 6, the arrow on its left-hand side indicates the forward direction of the vehicle. As shown e.g. in FIG. 10, synchronizing gears 55 are provided between the two rack bars 53 and 54 so as to each mesh with both of the rack bars 53 and 54. As shown e.g. in FIG. 11, the synchronizing gears 55 are retained in a synchronizing gear box 66.

For each of the steering devices 10 and 20, as shown in FIGS. 2(*a*) and 2(*b*), the first and second rack bars 53 and 54 are connected to the right and left wheels w by connecting members 11, 21 hingedly connected to the wheels through the tie rods 12, 22. Knuckle arms or other members are disposed between the tie rods 12 and 22 and the respective wheels w.

Figure 7:
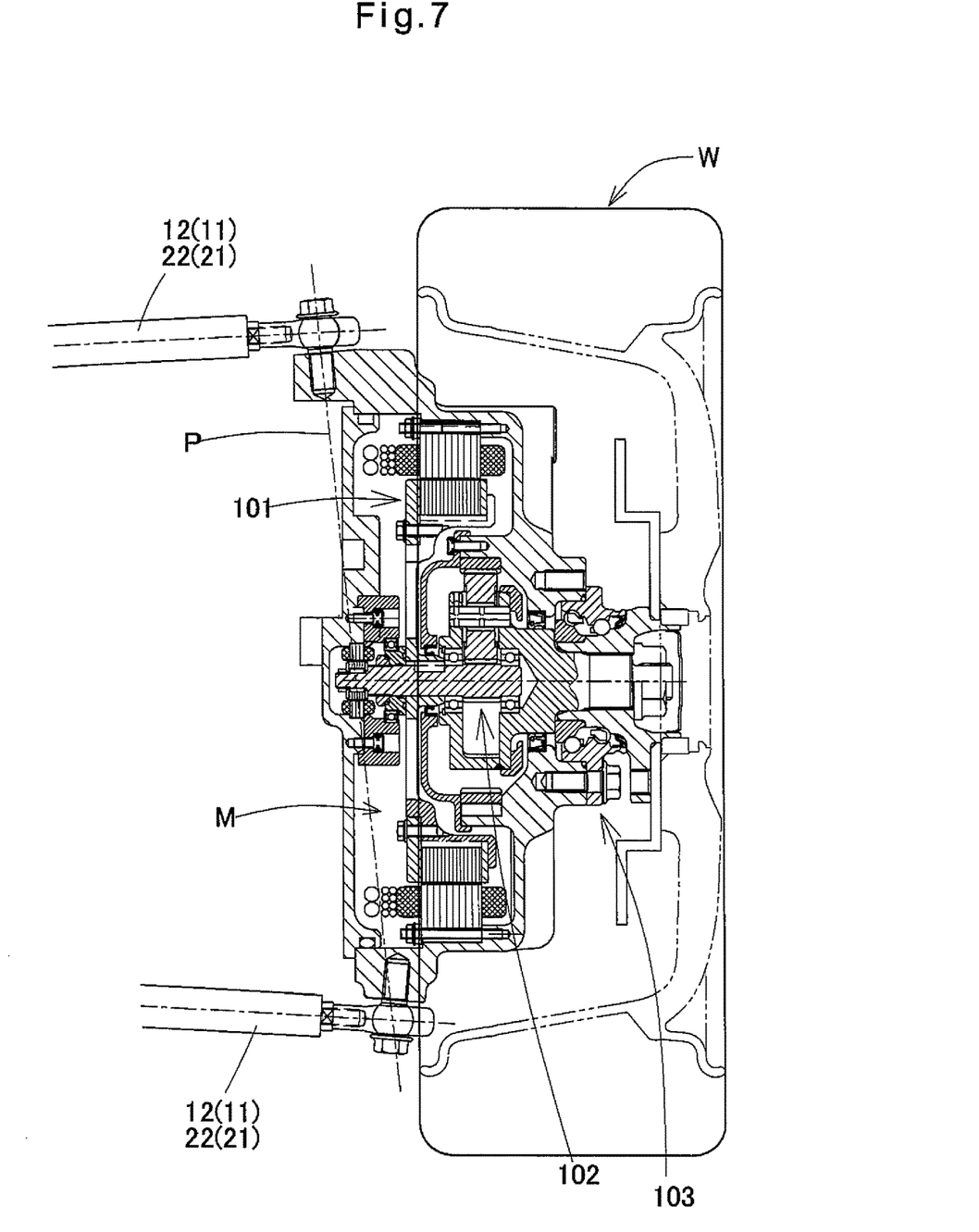
FIG. 7 is a sectional view of a wheel showing how the wheel is supported.

FIG. 7 shows how each tie rod 12, 22 is connected to the corresponding wheel w, in which is mounted the in-wheel motor M. Any of the wheels w is steerable about an axis P of kingpins supported by the vehicle frame. The in-wheel motor M includes a motor main body 101, a speed reducer 102 and a wheel bearing 103 which are arranged in series in this order from the inboard to outboard side of the vehicle.

Figure 8:
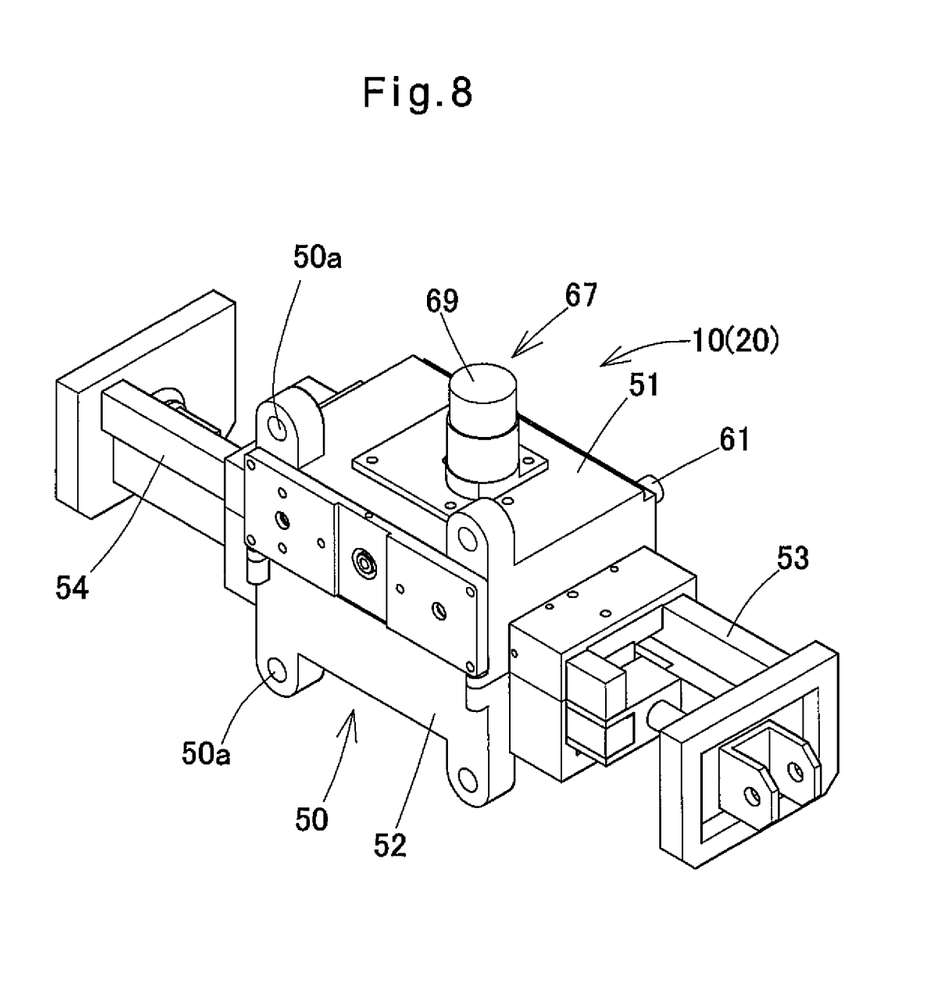
FIG. 8 is a perspective view of a steering device, showing its outer appearance.

For each of the steering devices 10 and 20, as shown in FIG. 8, the first and second rack bars 53 and 54 are mounted in a rack case (steering cylinder) 50 extending in the right-and-left direction of the vehicle relative to the direction in which the vehicle moves in a straight line (fore-and-aft direction of the vehicle). The rack case 50 is supported by the frame (chassis), not shown, of the vehicle 1.

The rack case 50 may be supported by the vehicle 1 by directly or indirectly fixing flanges of the rack case 50 to the frame of the vehicle 1 by means of screws or bolts.

The first rack bar 53 and the second rack bar 54 are movable together with each other in the rack case 50, in the right-and-left direction of the vehicle relative to the direction in which the vehicle moves in a straight line. A normal steering actuator 31 causes this movement based on the operation of the steering 2 by the driver. This movement causes the corresponding right and left wheels to be steered in the right direction or in the left direction.

Figure 9:
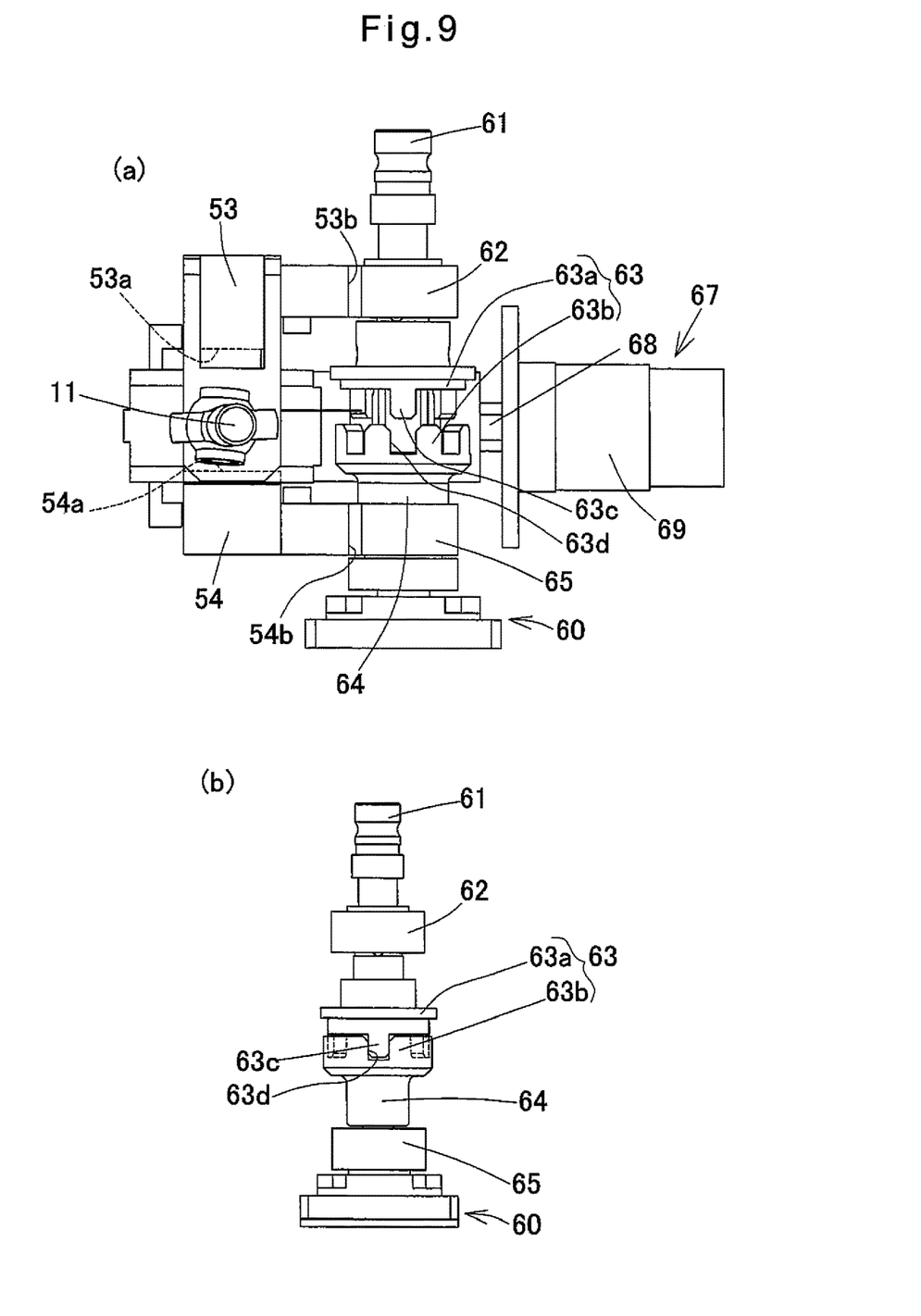
FIGS. 9(a) and 9(b) are front views of the steering device, showing the detailed structure of its rack bar moving means.

The pinion shaft 61, shown in FIGS. 9(*a*) and 9(*b*), is connected to a steering shaft 3 (if the vehicle 1 is an ordinary vehicle; see FIG. 2(*a*)), or to an actuator 31, such as a motor, actuated when the steering 2 is tuned (if the vehicle 1 is of the steer-by-wire type; see FIG. 2(*b*)). A first pinion gear 62 is integral with the pinion shaft 61, or joined to, so as to be rotatable together with, the pinion shaft 61, and meshes with the first rack bar 53. The steering device further includes a second pinion gear 65 meshing with the second rack bar 54. The first and second rack bars 53 and 54 extend parallel to each other.

The steering device further includes a coupling mechanism 63 capable of rotationally coupling and uncoupling the first and second pinion gears 62 and 65. FIG. 9(*a*) shows the state in which the first and second pinion gears 62 and 65 are uncoupled from each other, while FIG. 9(*b*) shows the state in which they are coupled together.

Figure 10:
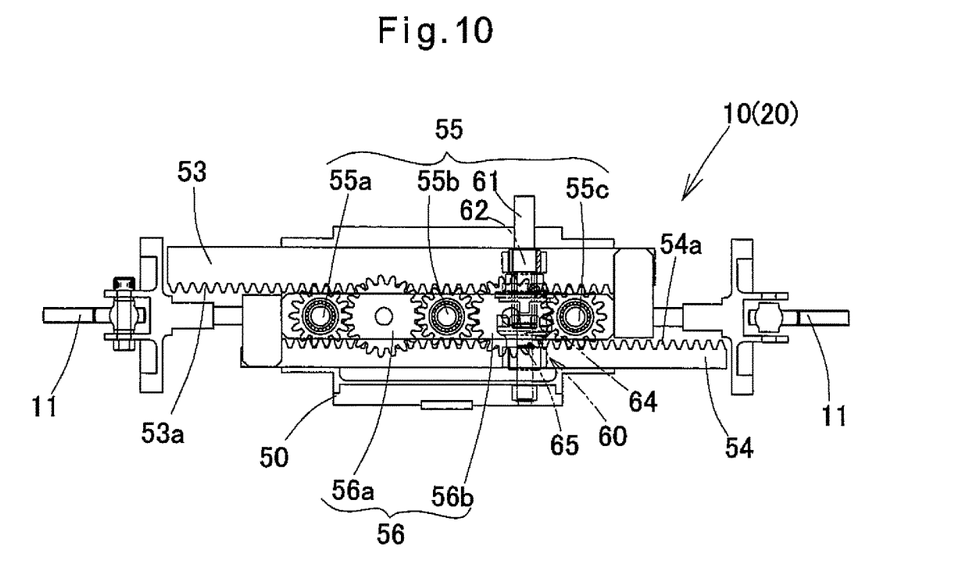
FIG. 10 is a plan view of the steering device, showing its interior.

As shown in FIG. 10, each of the steering devices 10 and 20 includes a rack bar moving means 60. The rack bar moving means 60 is capable of moving the first and second rack bars 53 and 54, respectively, in one and the other of the right and left directions relative to the direction in which the vehicle moves in a straight line (i.e. the opposite directions in which the rack teeth are arranged) by the same distance, or moving both the first and second rack bars 53 and 54 in one of the right and left directions.

As shown in FIG. 10, the rack bar moving means 60 includes first synchronizing gears 55 each meshing with both a synchronizing rack gear 53*a* of the first rack bars 53 and a synchronizing rack gear 54*a* of the second rack bar 54, which faces the synchronizing rack gear 53*a*.

The first synchronizing gears 55 comprise three gears 55*a*, 55*b* and 55*c* that are arranged in the direction in which the rack teeth of the rack gears of the rack bars 53 and 54 and spaced apart from each other at regular intervals. When, with the first and second pinion gears 62 and 65 uncoupled from each other by the coupling mechanism 63 shown in FIGS. 9(*a*) and 9(*b*), the first rack bar 53 is moved in one of the opposite directions in which the rack teeth are arranged under a driving force applied from the rack bar moving means 60, this movement is converted to the movement of the second rack bar 54 in the other of the opposite directions.

Figure 11:
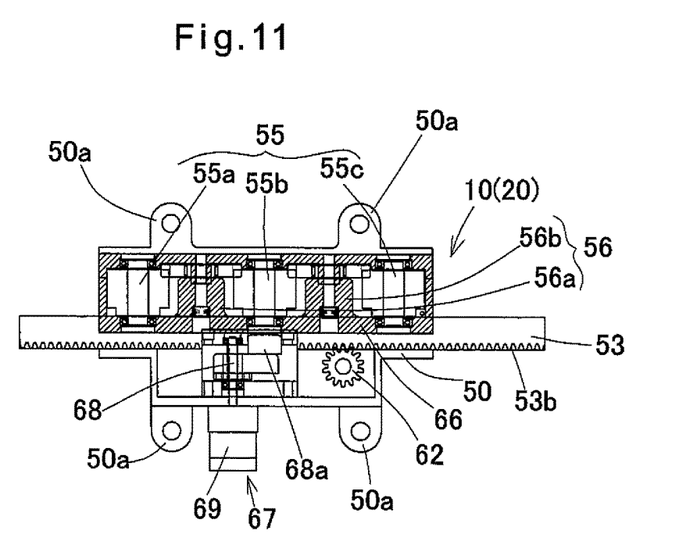
FIG. 11 is a front view of the steering device, showing its interior.

As shown in FIG. 11, each steering device 10, 20 further includes a fixing mechanism 67 through which the synchronizing gear box 66 is fixed to the rack case 50. The fixing mechanism 67 may include a trapezoidal screw 68 having a pressed portion 68*a*, and an actuator 69 (motor) for fixing the synchronizing gear box 66 and configured to turn the trapezoidal screw 68 to press the pressed portion 68*a* against the synchronizing gear box 66, thereby fixing the gear box 66 in position. Instead of the trapezoidal screw 68 used in this embodiment, an actuator such as a push-pull solenoid may be used as the fixing mechanism 67.

Since the rack case 50 has four flanges 50*a* screwed to the vehicle frame, by fixing the synchronizing gear box 66 to the rack case 50 by means of the fixing mechanism 67, the synchronizing gear box 66 is fixed to the vehicle frame. By fixing the synchronizing gear box 66 relative to the rack case 50 while the vehicle is moving in a straight line, the steering angles of the right and left wheels are kept the same not only while the vehicle is moving in a straight line but when the steering is turned 2 by any angle.

As shown in FIGS. 10 and 11, the rack bar moving means 60 further includes second synchronizing gears 56 comprising gears 56a and 56b which are disposed between the adjacent first synchronizing gears 55, i.e. between the gears 55a and 55b and between the gears 55b and 55c, respectively. The second synchronizing gears 56 are in mesh with neither of the synchronizing rack gear 53a of the first rack bar 53 and the synchronizing rack gear 54a of the second rack bar 54, and are in mesh with only the first synchronizing gears 55. The second synchronizing gears 56 serve to rotate the three first synchronizing gears 55a, 55b and 55c by the same angle in one same circumferential direction. The second synchronizing gears 56 ensure smooth relative movement between the first rack bar 53 and the second rack bar 54.

As shown in FIGS. 9(a) and 9(b), the first and second rack bars 53 and 54 include, besides the synchronizing rack gears 53a and 54a, steering rack gears 53b and 54b, respectively.

The synchronizing rack gear 53a, 54a and the steering rack gear 53b, 54b, of each of the first and second rack bars 53 and 54 may be separate members from each other that are fixed together by means of e.g. bolts.

Through the steering rack gears 53b and 54b, driving forces for moving the respective rack bars 53 and 54 in one of the opposite directions in which the rack teeth are arranged are applied.

When the first rack bar 53 is moved from the position of FIG. 12(a) (where the vehicle is moving in a straight line) to the position of 12(b) (where the vehicle in the below-described lateral travel mode) under a driving force applied from the rack bar moving means 60, this driving force is applied through the first synchronizing gears 55 to the second rack bar 54, and thus moves the second rack bar 54 from the position of 12(a) to the position of FIG. 12(b).

Figure 12:
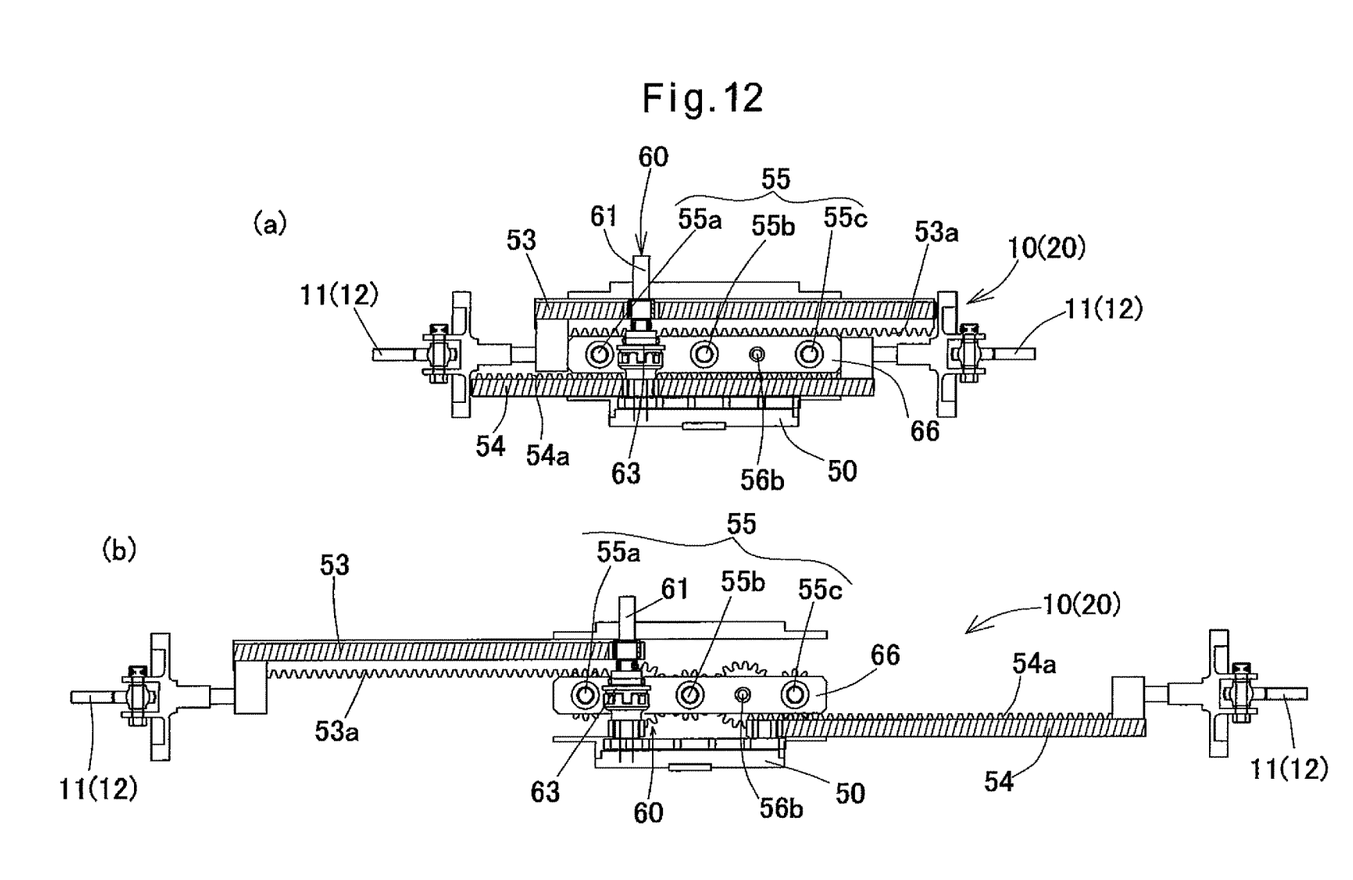
FIGS. 12(a) and 12(b) are plan views of the steering device, showing, respectively, the state in which a pair of rack bars are close to each other, and the state in which the rack bars are opened.

While the vehicle is traveling in a straight line (see FIG. 12(a)), the coupling mechanism 63 becomes meshed, with the tires (rack bars) in the position while the vehicle is traveling in a straight line, so that the first pinion gear 62 and the second pinion gear 65 are rotationally fixed together. When the steering shaft 3 is rotated by turning the steering 2 in this state, the first rack bar 53 and the second rack bar 54 move in one of the right and left directions by the same distance in the rack case 50 mounted to the frame.

During the lateral travel mode (see FIG. 12(b)), the coupling mechanism 63 is uncoupled with the first rack bar 53 and the second rack bar 54 meshing with the synchronizing gears 55 in the synchronizing gear box 66. As a result, the rack bars 53 and 54 are moved relative to the synchronizing gear box 66 in the directions opposite to each other. By fixing the synchronizing gear box 66 to the rack case 50, which is fixed to the frame, even if surfaces with which the right and left wheels w (tires) are brought into contact are inclined or are different in frictional state from each other, it is possible to move the pair of rack bars 53 and 54 by the same distance in the right and left directions, respectively, relative to the synchronizing gear box 66. This in turn makes it possible to move (steer) the right and left wheels w connected to the respective rack bars 53 and 54 through the tie rods 12 and 22, always by the same angle as each other.

The operation of the rack bar moving means 60 is now described.

As shown in FIGS. 9(a) and 9(b), the rack bar moving means 60 of the steering device 10 for the front wheels includes a first rotary shaft (pinion shaft) 61 configured to be rotated under a driving force of the normal steering actuator 31, shown in FIGS. 2(a) and 2(b), actuated when the steering 2 is turned by a driver, or under a driving force of a mode switching actuator 32, also shown in FIGS. 2(a) and 2(b), actuated when a mode switching means 42 of the vehicle 1 is operated, and a first pinion gear 62 mounted on the rotary shaft 61 so as to be rotatable together with the first rotary shaft 61. Rotation is transmitted from the actuating shaft of the normal steering actuator 31 or the mode switching actuator 32 to the first rotary shaft 61 through a steering joint.

FIGS. 9(a) and 9(b) also show the rack bar moving means 60 of the steering device 20 for the rear wheels, and thus, this rack bar moving means 60 also includes a first rotary shaft 61 configured to be rotated under a driving force of the normal steering actuator 31 or the mode switching actuator 32, shown in FIGS. 2(a) and 2(b), and a first pinion gear 62 mounted on the rotary shaft 61 so as to be rotatable together with the first rotary shaft 61. Rotation is transmitted from the actuating shaft of the normal steering actuator 31 or the mode switching actuator 32 to the first rotary shaft 61 through the steering joint.

Each rack bar moving means 60 includes, besides the first pinion gear 62, which is integral with or fixed to the first rotary shaft 61, a second rotary shaft 64 aligned with the first rotary shaft 61, and a second pinion gear 65 mounted on the second rotary shaft 64 so as to be rotatable together with the second rotary shaft 64.

FIG. 8 is a perspective view of the entire steering device 10, 20. As shown, the first rack bar 53, the second rack bar 54, etc. are disposed between a front cover 52 and a rear cover 51. While not shown, boots are provided to extend from portions where the tie rods 12 and 22 are mounted to the rack case 50 (its front and rear portions 51 and 52) to prevent contact of foreign matter with moving parts. The first rotary shaft 61 is connected to the actuating shaft of the mode switching actuator 32 through the steering joint, not shown.

As shown in FIGS. 9(a) and 9(b), the first pinion gear 62 is in mesh with the steering rack gear 53b of the first rack bar 53, and the second pinion gear 65 is in mesh with the steering rack gear 54b of the second rack bar 54.

The rack bar moving means 60 further includes a coupling mechanism 63 disposed between the first pinion gear 62 and the second pinion gear 65 and configured to selectively uncouple the first and second rotary shafts 61 and 64 from each other (so that they can rotate relative to each other) and couple the shafts 61 and 64 together (so that they cannot rotate relative to each other).

As shown in FIGS. 9(a) and 9(b), the coupling mechanism 63 includes a fixed part 63b provided on the second rotary shaft 64, and a moving part 63a provided on the first rotary shaft 61. The coupling mechanism 63 is configured such that when the moving part 63a is pressed against the fixed part 63b, protrusions 63c formed on the moving part 63a are engaged in recesses 63d formed in the fixed part 63b, thereby allowing the shafts 61 and 64 to rotate together. However, conversely to the above, the protrusions 63c may be formed on the fixed part 63b, and the recesses 63d may be formed in the moving part 63a.

The coupling mechanism 63 is further configured such that the moving part 63a can be moved axially away from the fixed part 63b by an external driving source such as a push solenoid until the fixed part 63b and the moving part 63a are uncoupled from each other, and the first and second rotary shafts 61 and 64, and thus the first and second pinion gears 62 and 65, are uncoupled from each other and rotatable independently of each other, as shown in FIG. 9(a). FIG. 9(b) shows the state in which the first and second pinions gears 62 and 65 are coupled together.

While the coupling mechanism 63 is uncoupled and thus the first pinion gear 62 and the second pinion gear 65 are rotatable relative to each other, since the first and second pinion gear 62 and 65 are in mesh with the first and second rack bars 53 and 54, respectively, and the first and second rack bars 53 and 54 are in mesh with each other through the first synchronizing gears 55, when the first pinion gear 62 is rotated, and the first rack bar 53 is moved in one of the opposite directions in which the rack teeth are arranged, i.e. one of the right and left directions of the vehicle, the first synchronizing gears 55 rotate, thus moving the second rack bar 54 in the other of the right and left directions by the same distance as the first rack bar 53 is moved. At this time, the second pinion gear 65 is rotated by the second rack bar 54 independently of the first pinion gear 62.

Thus, by selectively coupling together the first and second pinion gears 62 and 65 and uncoupling them from each other by means of the coupling mechanism 63, it is possible to, easily, either move the rack bars 53 and 54 in one of the right and left directions together with each other, or move the rack bars 53 and 54 in the opposite directions to each other.

That is, with the first rack bar 53 and the second rack bar 54 coupled together through the first pinion gear 62 and the second pinion gear 65 by means of the coupling mechanism 63, when a driver turns the steering 2, the first rack bar 53 and the second rack bar 54 are moved together with each other in one of the right and left directions with respect to the direction in which the vehicle is moved in a straight line. As a result, the corresponding right and left wheels w can be steered about the respective kingpin axes P (see FIG. 7) in the same direction. At this time, since the first rack bar 53 and the second rack bar 54 are moved together with each other, the first synchronizing gears 55 do not rotate.

When the first pinion gear 62 and the second pinion gear 65 are uncoupled from each other, it is possible to move the first rack bar 53 and the second rack bar 54 in one and the other of the right and left directions, with respect to the direction in which the vehicle is moved in a straight line, thereby steering the right and left wheels w in opposite directions to each other about the respective kingpin axes P (FIG. 7).

Thus, in this embodiment, when the steering 2 is rotated by a driver, the rotation of the steering 2 is transmitted to the first rotary shaft 61 through the steering shaft 3. During normal operation (while the coupling mechanism 63 is coupled), the rack bar moving means 60 serves to move the first rack bar 53 and the second rack bar 54 together with each other.

During mode switching, the driving force of the mode switching actuator 32 is transmitted to the respective rack bars 53 and 54 due to rotation of the respective pinion gears 62 and 65. While the driving force of the mode switching actuator 32 is being applied to the respective rack bars 53 and 54 through the pinion gear 62, the rotation of the steering shaft 3 may or may not be transmitted to the steering 2.

The normal steering actuator 31 may have the function of the mode switching actuator 32 too. That is, during mode switching, the rotation of the steering shaft 3 may be transmitted to the first rotary shaft 61 through the normal steering actuator 31.

Also, the in-wheel motors M on both sides of the steering device 10, 20 may be configured and designed to serve as the mode switching actuator 32. Further, the wheels may be steered the steering force generated by the normal steering actuator 31, the mode switching actuator 32, the right and left in-wheel motors M, or a combination of them.

Now description is made of several travel modes of the vehicle in which the steering devices 10 and 20 are mounted.
(Normal Travel Mode)

With the wheels positioned as shown in FIGS. 2(a) and 2(b), in which the vehicle is supposed to travel in a straight line, the coupling mechanism 63, shown in FIGS. 9(a) and 9(b), of the steering device 10 for the front wheels is coupled, whereby the first rack bar 53 and the second rack bar 54, which are held by the rack case 50, are movable together with each other. The pair of rack bars 53 and 54 in the rack case 50 mounted to the frame of the vehicle are thus moved in one of the right and left directions of the vehicle 1 together with each other.

Figure 3:
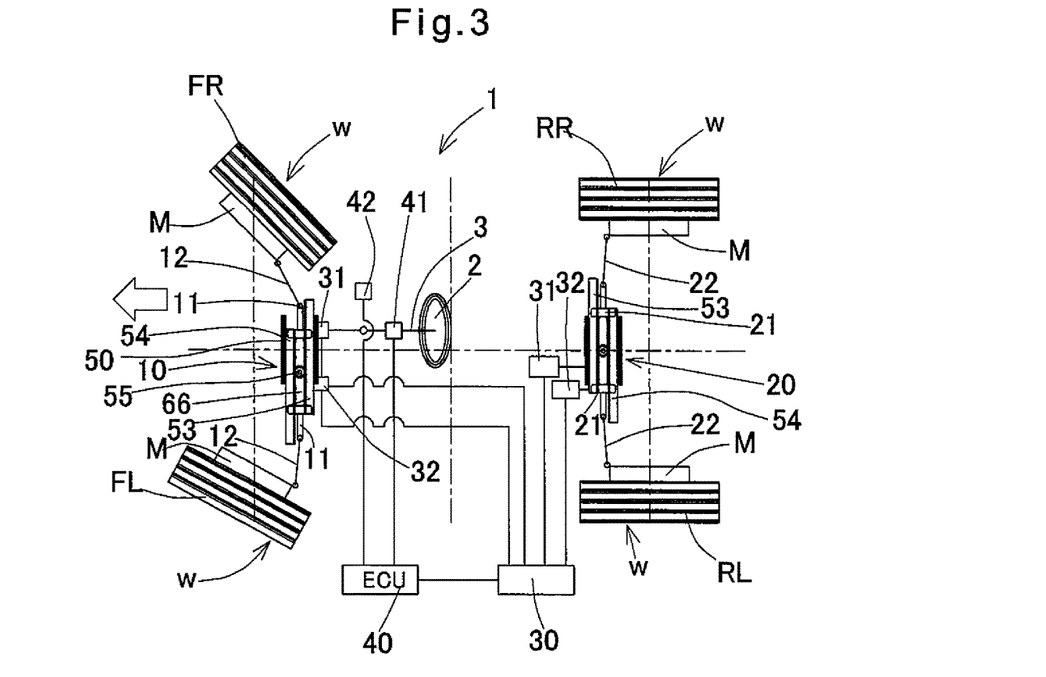
FIG. 3 is a plan view of the vehicle of FIG. 2 during a normal travel mode (normal steering mode).

When the first and second rack bars 53 and 54 of the steering device 10 are moved together with each other by the same distance in one of the right and left directions with respect to the direction in which the vehicle is moved in a straight line, under the driving force of the normal steering actuator 31 or by operating the steering 2, the front right and front left wheels w are steered by a predetermined angle. FIG. 3 shows the state of the vehicle when the front wheels are steered to the right. That is, by completely fix the rack bars 53 and 54 to each other, the vehicle 1 can travel in the same manner as ordinary vehicles. During the normal travel mode, when a driver operates the steering 2, the front wheels are steered through the steering device 10 for the front wheels such that the vehicle can travel in a straight line, turn right or left, or travel otherwise according to situations.
(Small Radius Turning Mode)

Figure 4:
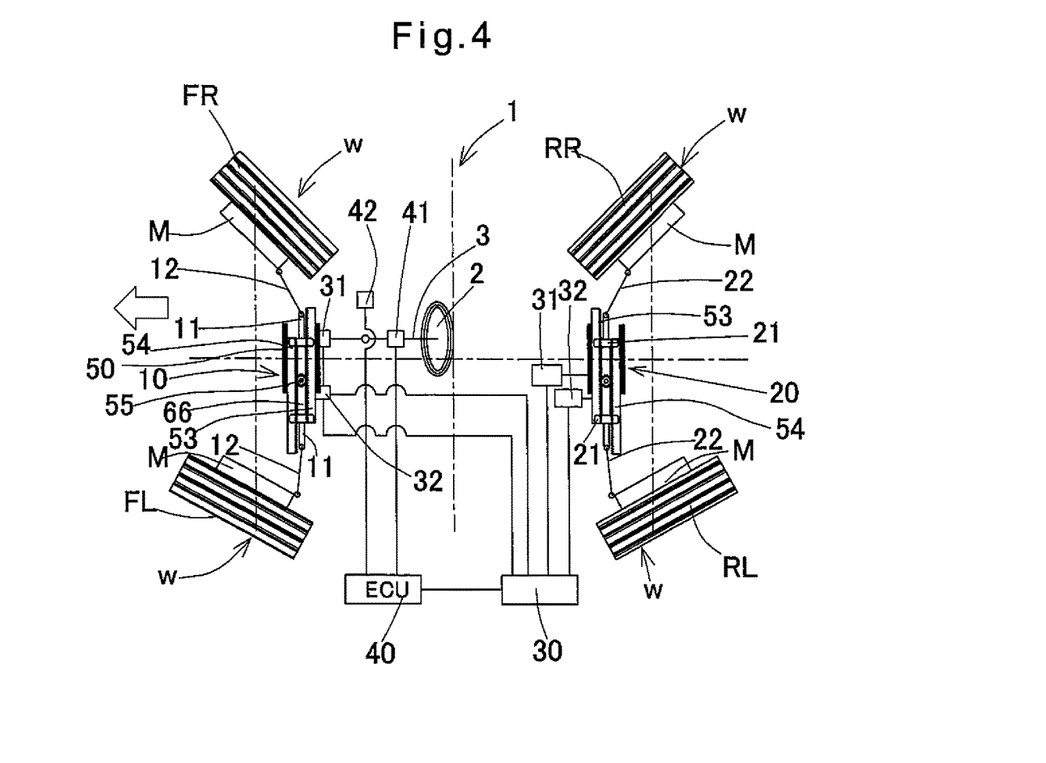
FIG. 4 is a plan view of the vehicle of FIG. 2 during a small-radius turning mode.

FIG. 4 shows a small radius turning mode, in which the steering device 10 for the front wheels is moved as shown in FIG. 3, and further, the coupling mechanism 63, shown in FIGS. 9(a) and 9(b), of the steering device 20 for the rear wheels are also coupled, whereby the first rack bar 53 and the second rack bar 54 of the steering device 20 are movable together with each other. The pair of rack bars 53 and 54 in the rack case 50 of the steering device 20, which is fixed to the frame of the vehicle, are thus also moved in one of the right and left directions of the vehicle 1 together with each other.

When the first and second rack bars 53 and 54 of the steering device 20 are moved together with each other by the same distance in one of the right and left directions with respect to the direction in which the vehicle is moved in a straight line under the driving force of the normal steering actuator 31, the rear right and rear left wheels w are steered by a predetermined angle as shown in FIG. 4. At this time, the rear wheels are steered in the opposite direction to the direction in which the front wheels are steered. (In FIG. 4, the front wheels are steered to the right, while the rear wheels are steered to the left.) This allows the vehicle to be turned with a smaller radius than during the normal travel mode. In FIG. 4, the rear wheels are steered in the opposite direction to the direction in which the front wheels are steered by the same angle as the front wheels, but may be steered by a different angle from the angle by which the front wheels are steered. Also, if the rear wheels are steered in the same direction as the front wheels, the vehicle can be moved in a different travel mode.

(Pivot Turn Mode)

Figure 5:
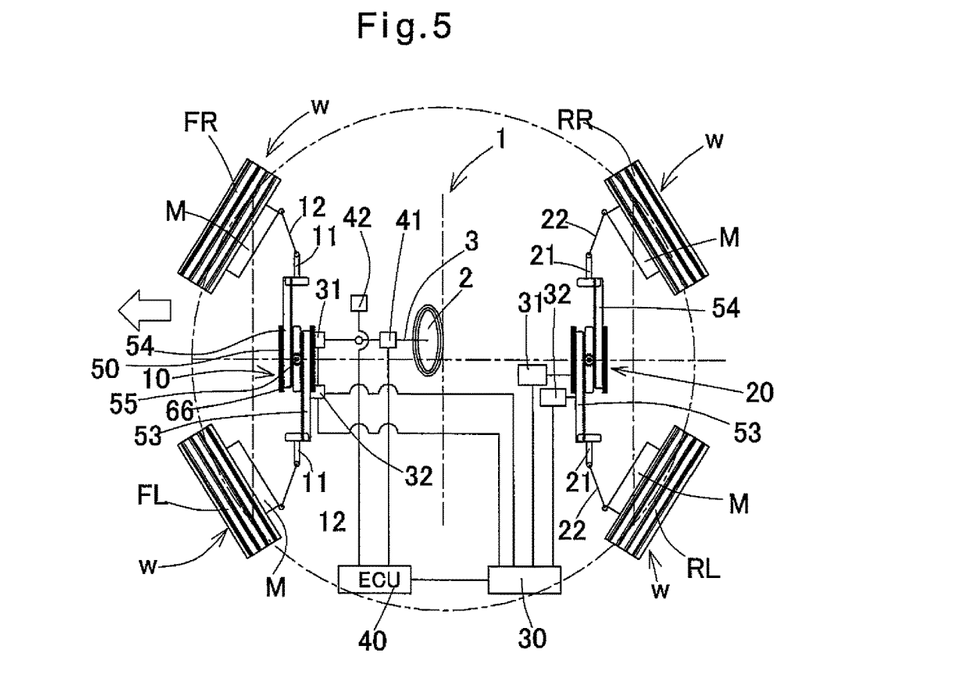
FIG. 5 is a plan view of the vehicle of FIG. 2 during a pivot turn mode.

A pivot turn mode is shown in FIG. 5. In this mode, for each of the steering devices 10 and 20, the synchronizing gear box 66 is fixed to the rack case 50 at the position where it is fixed while the vehicle is traveling in a straight line, by means of the fixing mechanism 67, and the coupling mechanism 63 (see FIGS. 9(a) and 9(b)) is uncoupled, whereby the first rack bar 53 and the second rack bar 54 are movable separately from each other. Thus, when the driving force of the mode switching actuator 32 is applied to the first pinion gear 62, the first rack bar 53 and the second rack bar 54 are moved by the same distance in the opposite directions to each other by the action of the first synchronizing gears 55 disposed between the first rack bar 53 and the second rack bar 54, so that the right and left wheels w are steered in the opposite directions. By fixing the synchronizing gear box 66 to the rack case 50 by means of the fixing mechanism 67 in this manner, even if surfaces with which the tires are brought into contact are inclined or are different in frictional state from each other, it is possible to move the pair of rack bars 53 and 54 by the same distance in the right and left directions, respectively, relative to the synchronizing gear box 66, which is fixed in position. This in turn makes it possible to quickly move the right and left wheels w to the target steering angle, and the wheels can be steered in a stable manner.

The first and second rack bars 53 and 54 of each of the steering devices 10 and 20 are moved in the opposite directions to each other until, as shown in FIG. 5, the center axes of all four wheels w substantially extend to the center of the vehicle, and the coupling mechanisms 63 of the respective steering devices 10 and 20 are coupled in this state. Since the center axes of all four wheels w substantially extend to the center of the vehicle, the vehicle can turn on the same spot with the center of the vehicle remaining unchanged (or substantially unchanged) under the driving forces from the in-wheel motors M mounted in the respective wheels w. Since the synchronizing gear box 66 remains fixed to the rack case 50 in this state, the vehicle can turn on the spot in a stable manner.

In this mode, the vehicle can be turned on the same spot not by all of the in-wheel motors M mounted in the respective wheels w but by at least one of them.

(Lateral Travel Mode)

Figure 6:
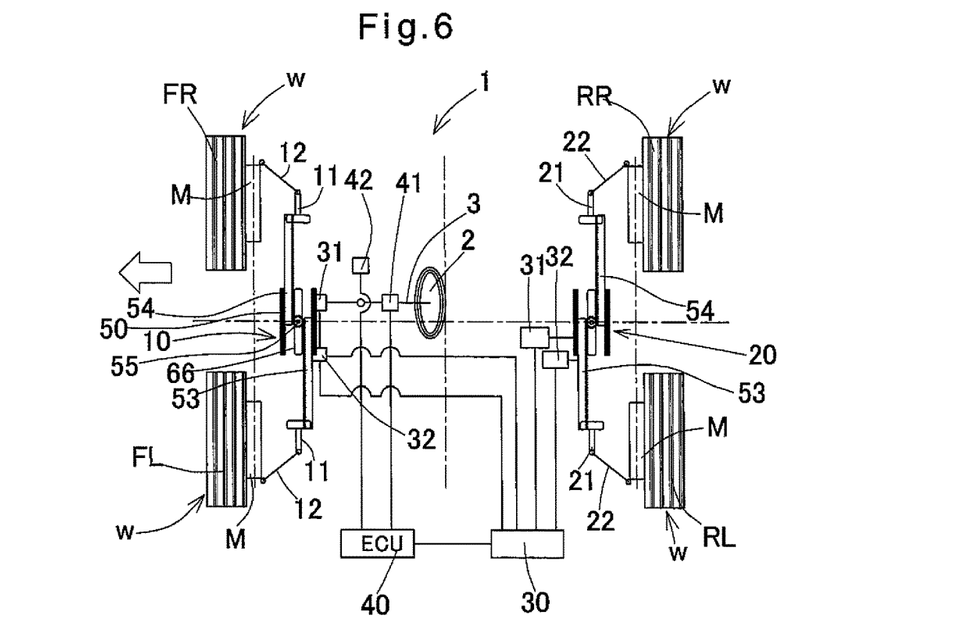
FIG. 6 is a plan view of the vehicle of FIG. 2 during a lateral travel (parallel travel) mode.

A lateral travel mode is shown in FIG. 6. In this mode, as in the pivot turn mode, for each of the steering devices 10 and 20, by fixing the synchronizing gear box 66 to the rack case 50 at the position where it is fixed while the vehicle is traveling in a straight line, by means of the fixing mechanism 67, and uncoupling the coupling mechanism 63 (see FIGS. 9(a) and 9(b)), the first and second rack bars 53 and 54 become movable separately from each other. Thus, when the driving force of the mode switching actuator 32 is applied to the first pinion gear 62, the first rack bar 53 and the second rack bar 54 are moved by the same distance in the opposite directions to each other by the action of the first synchronizing gears 55 disposed between the first rack bar 53 and the second rack bar 54, so that the right and left wheels w are steered in the opposite directions. By fixing the synchronizing gear box 66 to the rack case 50 by means of the fixing mechanism 67 in this manner, even if surfaces with which the tires are brought into contact are inclined or are different in frictional state from each other, it is possible to move the pair of rack bars 53 and 54 by the same distance in the right and left directions, respectively. This in turn makes it possible to quickly move the right and left wheels w to the target steering angle, and the wheels can be steered in a stable manner.

The first rack bar 53 and the second rack bar 54 of each steering device 10, 20 are moved in the opposite directions to each other such that all of the front and rear wheels are oriented in the direction perpendicular to the direction in which the vehicle travels in a straight line (right and left direction with respect to the direction in which the vehicle travels in a straight line), by applying a rotational force from the mode switching actuator 32 to the first pinion gear 62. With the wheels w oriented in the direction perpendicular to the direction in which the vehicle travels in a straight line, the coupling mechanism 63 (see FIGS. 9(a) and 9(b)) is coupled to fix the rack bars 53 and 54 in position.

In this state, unlike the pivot turn mode, with the synchronizing gear box 66 of each steering device 10, 20 disconnected from the rack case 50, the first and second rack bars 53 and 54 in the rack case 50 are moved in one of the right and left directions with respect to the direction in which the vehicle travels in a straight line, under the driving force of the normal steering actuator 31 or by operating the steering 2, to finely adjust the directions (angles) of the wheels w.

FIG. 6 shows the positional relationship between the steering devices 10 and 20 for the front and rear wheels, respectively, and the directions of the wheels w, during the lateral travel mode. Compared to the pivot turn mode, the rack bars 53 and 54 protrude laterally outwardly to a larger degree. Thus, in this mode, the connecting points between the tie rods 12 and 22 and the respective wheels w are located at the outermost positions in the width direction of the vehicle. During the lateral travel mode too, it is possible to finely adjust the directions (angles) of the wheels w under the driving force of the normal steering actuator 31 or by operating the steering 2.

(Further Travel Mode)

In a further travel mode, when an electronic control unit (ECU) 40 determines that the vehicle 1 is traveling at a high speed, based on an output of the ECU 40, an actuator driver 30 drives the mode switching actuator 32 for the rear wheels such that the rear left and rear right wheels RL and RR are turned from the parallel position so as to be slightly closed at their front ends (toe-in state). This allows stable high-speed travel.

Such toe adjustment may be made based on travel states of the vehicle, such as the vehicle speed and loads on the axles, as determined by the ECU 40, or based on the input from the mode switching means 42, which is provided in the driver/passenger cabin. A driver can switch the travel mode by operating the mode switching means 42. The mode switching means 42 may be a switch, a lever or a joystick operable by a driver.

(Mode Switching)

The mode switching means 42 is also used to switch one of the above travel modes to another. That is, by operating the mode switching means 42, it is possible to select any of the normal travel mode, pivot turn mode, lateral travel mode, small-radius turning mode, etc. The mode switching means 42 may be a switch, a lever, a joystick, etc. Since any travel mode is selectable by operating e.g. a switch, the mode switching can be made safely.

During the normal travel mode, the ECU 40 calculates the necessary moving amount of the rack bars 53 and 54 of the steering device 10 in one of the right and left directions, based on information from a sensor 41 when the steering 2 is operated, and based on the results of calculation, the ECU 40 controls the normal steering actuator 31 for the front wheels, to move, together with each other, the rack bars 53 and 54 received in the rack case 50 in the one of the right and left directions, thereby steering the front right and front left wheels w by necessary angles in a necessary direction.

When the pivot turn mode is selected by operating the mode switching means 42, it is possible to steer the four wheels w through the steering devices 10 and 20 for the front and rear wheels, respectively, such that the vehicle 1 turns substantially about the center of the vehicle. This mode is permitted only while the vehicle 1 is at a stop. During the pivot turn mode, the ECU 40 calculates the relative movements of the rack bars 53 and 54 of the respective steering devices 10 and 20, and based on the results of calculation, the ECU 40 controls, through the actuator driver 30, the mode switching actuators 32 for the front and rear wheels, thereby steering the wheels.

When the lateral travel mode is selected by operating the mode switching means 42, it is possible to steer the four wheels w through the steering devices 10 and 20 for the front and rear wheels, respectively, such that the four wheels w form a steering angle of 90 degrees. At this time, too, the ECU 40 calculates the relative movements of the rack bars 53 and 54 of the respective steering devices 10 and 20, and based on the results of calculation, the ECU 40 controls, through the actuator driver 30, the mode switching actuators 32 for the front and rear wheels, thereby steering the wheels. The normal steering actuators 31 may be configured, during the lateral travel mode, to be deactivated, or kept activated so that the steering angles can be finely adjusted by the normal steering actuators 31.

When the small-radius turning mode is selected by operating the mode switching means 42, the front wheels and the rear wheels are steered in opposite directions to each other so that the vehicle can turn with a smaller radius. During the small-radius turning mode, the ECU 40 calculates moving amounts of the rack bars 53 and 54 of the steering device 20 for the rear wheels, which are received in the rack case 50, based on e.g. the operation of the steering 2, and based on the results of calculation, the ECU 40 controls, through the actuator driver 30, the normal steering actuator 31 for the steering device 20 to steer the rear wheels. The steering device 10 for the front wheels is controlled in the same manner as during the normal travel mode.

As described above, based on the steering angle of the steering 2, the information from the sensor 41, which detects e.g. the steering torque, and/or the input from the mode switching means 42, or based on the travel condition of the vehicle determined by the ECU 40 itself, the ECU 40 calculates necessary moving amounts of the rack bars 53 and 54 of the respective steering devices 10 and 20, and based on the results of calculation, the ECU 40 controls, through the actuator driver 30, the normal steering actuators 31 or the mode switching actuators 32, of the respective steering devices 10 and 20, thereby steering the front and rear wheels.

In the embodiment, the steering device 20 for the rear wheels is controlled by the steer-by-wire configuration, in which the steering operation as well as the operation of the mode switching actuator 32, which are carried out by a driver, are converted to electric signals to steer the wheels.

For the steering device 10 for the front wheels too, the steer-by-wire configuration using the normal steering actuator 31 and the mode switching actuator 32 may be used. In another arrangement, the normal steering actuator for the steering device 10 comprises a motor coupled to a steering 2, which is operated by a driver, or to the steering shaft 3, and configured to assist the manual steering operation by generating torque necessary to move the rack bars 53 and 54 in the right and left directions. In this arrangement, the mode switching actuator 32 for the front wheels is of the same structure as the actuator 32 for the rear wheels.

The steering device 10 for the front wheels, which is used for steering during the normal travel mode, may be an ordinary steering device using an ordinary mechanical rack and pinion mechanism.

The above-described travel modes are mere examples, and other control modes using the above-described mechanism are feasible.

According to the present invention, during the normal travel mode, steering operation can be made without giving the driver any feeling different from conventional steering operation, and also allows various travel modes including pivot turning, lateral traveling and small-radius turning. During a special travel mode such as the pivot turn mode or the lateral travel mode, the synchronizing gear box 66 is fixed to the rack case 50 by means of the fixing mechanism 67, so that even if surfaces with which the tires are brought into contact are inclined or are different in frictional state from each other, it is possible to move the pair of rack bars 53 and 54 by the same distance in the right and left directions, respectively, relative to the synchronizing gear box 66, which is fixed in position. This in turn makes it possible to quickly steer the right and left wheels w to a target angle, while enabling e.g. lateral traveling, small-radius turning, etc. without using a complicated mechanism and thus at a low cost.

DESCRIPTION OF THE NUMERALS

1. Vehicle
2. Steering
3. Steering shaft (operating shaft)
10, 20. Steering device
11, 21. Connecting member
12, 22. Tie rod
30. Actuator driver
31. Normal steering actuator
32. Mode switching actuator
40. Electronic control unit (ECU)
41. Sensor
42. Mode switching means
66. Synchronizing gear box
67. Fixing mechanism
w. Wheel

What is claimed is:
1. A steering device comprising:
tie rods connected, respectively, to right and left wheels which constitute a pair of front wheels of a vehicle or a pair of rear wheels of the vehicle, the tie rods being configured to steer the respective right and left wheels;
a pair of rack bars connected to the respective tie rods,
a synchronizing gear meshing with the pair of rack bars, the synchronizing gear being configured to convert a movement of a first one of the rack bars in a first one of opposite directions, which are right and left directions, along a direction in which teeth of the rack bars are arranged, to a movement of a second one of the rack bars in a second one of the opposite directions,
a rack bar moving means capable of moving the respective rack bars in the opposite directions,
a synchronizing gear box retaining the synchronizing gear and capable of moving in the right and left directions, a rack case retaining the rack bars and fixed to a frame of the vehicle, and a fixing mechanism capable of fixing the synchronizing gear box to the rack case, wherein the steering device is configured such that when the rack bars are moved in the first one and the second one of the opposite directions, respectively, the synchronizing gear box is fixed to the rack case by the fixing mechanism.

2. The steering device of claim 1, wherein the steering device is configured such that when the synchronizing gear box is at a position where the synchronizing gear box is supposed to be located while the vehicle is moving in a straight line, the synchronizing gear box is fixed to the rack case by the fixing mechanism.

3. The steering device of claim 1, wherein the steering device is configured such that when the rack bars are moved in the first one and the second one of the opposite directions, respectively, the synchronizing gear box is fixed to the rack case by the fixing mechanism.

4. The steering device of claim 2, wherein the steering device is configured such that when the rack bars are moved in the first one and the second one of the opposite directions, respectively, the synchronizing gear box is fixed to the rack case by the fixing mechanism.

* * * * *